United States Patent [19]

Sneed

[11] 4,045,856

[45] Sept. 6, 1977

[54] PULLING TOOL

[76] Inventor: John E. Sneed, 4522 SW. 54th St., Fort Lauderdale, Fla. 33314

[21] Appl. No.: 753,609

[22] Filed: Dec. 22, 1976

[51] Int. Cl.[2] .............................................. B23P 19/04

[52] U.S. Cl. ...................................................... 29/262

[58] Field of Search ........................... 29/256, 258–262

[56] References Cited

U.S. PATENT DOCUMENTS

| | | | |
|---|---|---|---|
| 268,328 | 11/1882 | Webber | 29/262 |
| 520,258 | 5/1894 | Davis | 29/262 |
| 1,134,581 | 4/1915 | Barret | 29/262 |
| 1,650,964 | 11/1927 | Schmidt | 29/262 |
| 2,461,983 | 2/1949 | Jarrett | 29/261 |

*Primary Examiner*—James L. Jones, Jr.
*Attorney, Agent, or Firm*—Oltman and Flynn

[57] ABSTRACT

A pulling tool is used for pulling an object relative to a support. The pulling tool includes a pole having means at one end for engaging an object to be pulled. A stop is affixed at a selected position on the pole. A threaded, rotatable sleeve loosely or slidably receives the pole and has one end for abutment with the stop and another end from which the engaging means projects. An annular member threadedly engages the exterior of the sleeve to allow movement of the sleeve axially of the annular member upon rotation of the sleeve. A stand-off means is coupled to the annular member for engaging the support while the object is being pulled, and there is a handle for turning the sleeve to retract the sleeve and the pole relative to the fixed support.

10 Claims, 5 Drawing Figures

PULLING TOOL

BACKGROUND OF THE INVENTION

Transformers in power distribution systems are often provided with an assembly known as an elbow assembly. In connection with maintenance of the transformer, it is sometimes necessary to pull apart components of the elbow assembly. At the present time, this pulling operation must be performed manually. The components of the elbow assembly are frequently wedged together extremely tightly, so in order to pull them apart manually, it is necessary to jerk the parts forcefully and repeatedly. Considerable effort is required of the person performing this work, and sometimes injury results from the strain of such repeated, forceful jerking.

SUMMARY OF THE INVENTION

The present invention provides a tool which can be operated with a minimum of effort to pull an object relative to a support, and particularly to pull apart components of an elbow assembly in a transformer of a power distribution system. A preferred embodiment of the tool includes a pole having a hook at one end for engaging an object to be pulled. A stop in the form of a split ring is releasably affixed at a selected position on the pole. A threaded, rotatable sleeve slidably receives the pole therein and has one end for abutment with the stop and another end from which the hook projects. An annular member threadedly engages the exterior of the sleeve for movement of the sleeve axially of the annular member upon rotation of the sleeve. A pair of legs if pivotally coupled to the annular member for engaging the support, and a handle is provided for turning the sleeve to retract the sleeve and the pole relative to the support. By the use of this tool, elbow assemblies can be pulled apart without dangerous strain on the operator. However, the utility of the tool is not limited to pulling apart elbow assemblies.

Accordingly, it is an object of the present invention to reduce the amount of effort required to pull an object relative to a fixed support.

Another object of the invention is to provide a portable tool which can be quickly assembled for a pulling operation at a job site and disassembled for storage purposes.

A further object of the invention is to provide a tool for pulling an object relative to a support with an optimum amount of mechanical advantage.

Still another object of the invention is to provide a tool in which the initial position of a pulling pole relative to the remainder of the tool can be adjusted.

Other objects of this invention will appear from the following description and appended claims, reference being had to the accompanying drawings forming a part of this specification wherein like reference characters designate corresponding parts in the several views.

Figures 1, 2, 3, 4, 5:
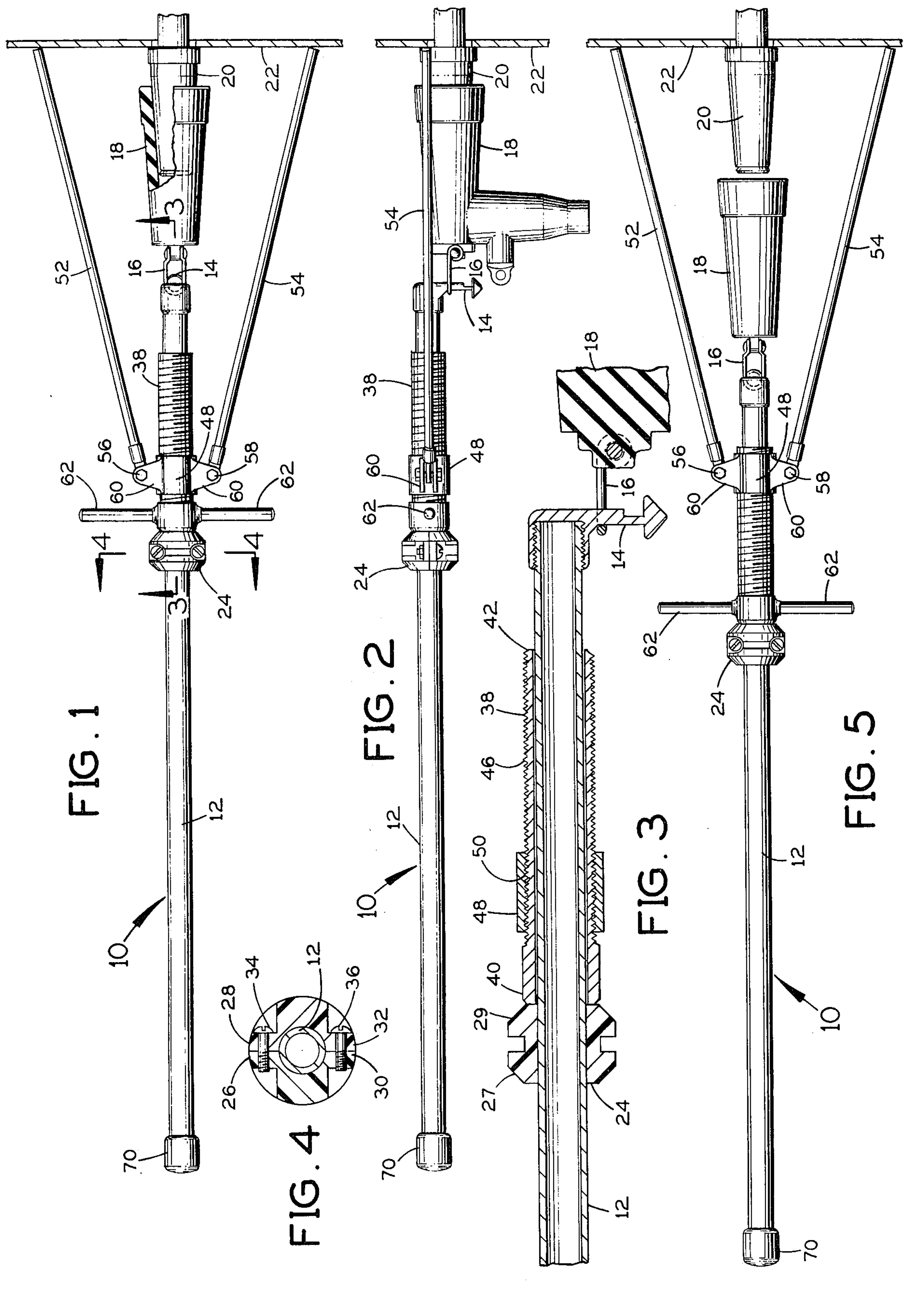
FIG. 1 is a top plan view of a tool in accordance with the preferred embodiment of the invention.
FIG. 2 is a right side elevational view of the tool of FIG. 1.
FIG. 3 is an enlarged sectional view taken along line 3—3 of FIG. 1 and looking in the direction of the arrows.
FIG. 4 is a cross-sectional view taken along line 4—4 of FIG. 1 and looking in the direction of the arrows.
FIG. 5 is a view similar to FIG. 1, but showing an elbow assembly after it has been pulled apart by operation of the tool.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The tool 10 includes a pole 12 which is preferably a long, steel tube of high tensile strength. The pole 12 has an engaging means 14 in the form of a hook affixed at the right end thereof as viewed in the drawings. The hook 14 is adapted to engage an eyelet 16 provided on female part 18 of an elbow assembly which also includes a male part 20. The male part 20 is in a fixed position relative to a wall 22 which provides a fixed support for the tool. The elbow assembly 18, 20 need not be mounted in exactly the manner shown in the drawings, but it is mounted in a fixed position relative to the support 22. The tool 12 serves in operation to pull the female part 18 from the male part 20 of the elbow assembly.

The tool 10 also includes a stop 24 affixed at a selected position on the pole 12. The stop 24 is preferably a split ring of plastic material having abutting portions 26, 28 and 30, 32 as shown particularly in FIG. 4. Abutting portions 26 and 28 are secured together by a screw 34, and abutting portions 30 and 32 are secured together by a screw 36 for the purpose of releasably affixing the split ring at a selected position on the pole. As will become apparent, the stop 24 can be adjusted to different positions along the length of the pole 12 in order to fix the position of the pole relative to the elbow assembly 18, 20. Fasteners other than screws 34, 36 may be utilized if desired.

A threaded, rotatable sleeve 38 loosely or slidably receives the pole 12 in the interior thereof and has one end 40 for abutment with the stop 24 and another end 42 from which the engaging hook 14 projects. The sleeve 38 is preferably made of nylon or brass, and preferably has exterior right-hand threads 46 with a very small pitch.

An annular member 48 has internal threads 50 matching the threads 46 for threadedly engaging the exterior of the sleeve 38. Upon counterclockwise rotation of the sleeve as viewed from the left, it moves axially of the annular member from the position shown in FIG. 1 to the position shown in FIG. 5.

Standoff means in the form of a pair of legs 52 and 54 is provided. The legs 52 and 54 are pivotally connected at 56 and 58 to a bracket 60 which is affixed to the annular member 48. The legs 52 and 54 serve to engage the support 22 while the female part 18 is being pulled from the male part 20. The legs can only pivot outward to the positions shown, and they can pivot inward until they are parallel.

A handle 62 is affixed to the sleeve 38 for turning the sleeve by manual operation to retract the sleeve and the pole 12 from the position shown in FIG. 1 to the position shown in FIG. 5 in order to pull the female part 18 from the male part 20.

The stop 24 preferably has beveled edges at 27 and 29 so that if the mouth of the sleeve at end 40 thereof is sufficiently wide, the beveled edges will engage inside the mouth.

The threads of the annular member 48 and the sleeve 42 are selected to provide a relatively great mechanical advantage upon rotation of the sleeve by turning the handle 62 so that a minimum of effort is required to operate the tool.

The pole 12 may be removed from the sleeve 42 by removing the cap 70 and sliding the pole 12 out of the sleeve. The legs 52 may be collapsed towards the axis of the sleeve. The stop 24 can be removed from the pole by unfastening the screws 34 and 36. Thus, the tool can be knocked down for storage purposes and readily assembled at a job site for a pulling operation.

Having thus described my invention, I claim:

1. A pulling tool for pulling an object relative to a support and comprising:
- a pole having engaging means at one end thereof for engaging an object to be pulled;
- a stop affixed at a selected position on said pole;
- a threaded rotatable sleeve loosely receiving said pole therein and having one end for abutment with said stop and another end from which said engaging means projects;
- an annular member threadedly engaging the exterior of said sleeve for movement of said sleeve axially of said annular member upon rotation of said sleeve;
- standoff means coupled to said annular member for engaging a support while said object is pulled; and
- means for turning said sleeve to retract said sleeve and said pole.

2. The pulling tool as claimed in claim 1 in which;
- said stop comprises a split ring having abutting portions; and
- fasteners for securing said abutting portions together to releasably affix said split ring at a selected position on said pole.

3. The pulling tool as claimed in claim 2 in which:
- said split ring has a beveled portion for engaging said one end of said sleeve.

4. The pulling tool as claimed in claim 1 in which: said engaging means comprises a hook.

5. The pulling tool as claimed in claim 4 in which:
- said stop comprises a split ring releasably affixed on said rod.

6. The pulling tool as claimed in claim 5 in which:
- said turning means comprises a handle.

7. The pulling tool as claimed in claim 6 in which:
- said standoff means comprises a pair of legs.

8. The pulling tool as claimed in claim 7 in which:
- said legs are pivotally connected to said annular member.

9. A pulling tool for pulling an object relative to a support and comprising:
- a pole having a hook at one end thereof for engaging an object to be pulled;
- a stop in the form of a split ring releasably affixed at a selected position on said pole;
- a threaded, rotatable sleeve slidably receiving said pole therein and having one end for abutment with said stop and another end from which said hook projects;
- an annular member threadedly engaging the exterior of said sleeve for movement of said sleeve axially of said annular member upon rotation of said sleeve;
- a pair of legs pivotally coupled to said annular member for engaging a support; and
- a handle for turning said sleeve to retract said sleeve and said pole.

10. A pulling tool as claimed in claim 9 in which:
- said stop includes fasteners for clamping said split ring on said pole and for releasing the same for adjustment relative to said pole.

* * * * *